(12) United States Patent
Farkas et al.

(10) Patent No.: US 8,923,164 B2
(45) Date of Patent: Dec. 30, 2014

(54) NODE AND METHOD FOR COMPUTING FORWARDING TREES TO DISTRIBUTE TRAFFIC IN A NETWORK

(75) Inventors: János Farkas, Kecskemét (HU); David Ian Allan, San Jose, CA (US); Scott Mansfield, Evans City, PA (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 489 days.

(21) Appl. No.: 13/143,593

(22) PCT Filed: Jun. 28, 2011

(86) PCT No.: PCT/IB2011/052849
§ 371 (c)(1),
(2), (4) Date: Jul. 7, 2011

(87) PCT Pub. No.: WO2012/014100
PCT Pub. Date: Feb. 2, 2012

(65) Prior Publication Data
US 2012/0120803 A1    May 17, 2012

Related U.S. Application Data

(60) Provisional application No. 61/367,518, filed on Jul. 26, 2010.

(51) Int. Cl.
*H04L 12/28*    (2006.01)
*H04L 12/753*   (2013.01)
*H04L 12/46*    (2006.01)
*H04L 12/721*   (2013.01)

(52) U.S. Cl.
CPC ............ *H04L 45/48* (2013.01); *H04L 12/4625* (2013.01); *H04L 45/12* (2013.01)
USPC ............ 370/256; 370/252; 370/254; 370/255

(58) Field of Classification Search
USPC ........................................................ 370/408
See application file for complete search history.

(56) References Cited

U.S. PATENT DOCUMENTS

| 7,197,244 B2 * | 3/2007 | Thomas et al. ................. 398/72 |
| 2002/0196745 A1 * | 12/2002 | Frouin et al. ................. 370/254 |
| 2006/0268749 A1 * | 11/2006 | Rahman et al. ............... 370/256 |

OTHER PUBLICATIONS

Allan, D. et al. Shortest Path Bridging: Efficient Control of Larger Ethernet Networks. COMMAG 10-00257. Apr. 28, 2010.
IEEE. Virtual Bridged Local Area Networks—Amendment 9: Shortest Path Bridging. IEEE P802.1aq/D2.5: Draft Amendment to IEEE Std. 802.1Q-2005. Jan. 6, 2010.
IEEE. Virtual Bridged Local Area Networks—Amendment: Provider Backbone Bridge Traffic Engineering. IEEE P802.1Qay/D5.0; Draft Amendment to IEEE Std. 802.1Q-2005. Jan. 21, 2009.
Ashwood-Smith, P. IEEE 802.1aq Shortest Path Bridging Equal Cost Tree (ECT) Framework. IEEE. Nov. 1, 2009.

(Continued)

*Primary Examiner* — Kibrom T Hailu
*Assistant Examiner* — James P Duffy

(57) ABSTRACT

A node and a method are described herein for computing forwarding trees to distribute traffic in a network. In addition, a network is described herein that has a plurality of nodes interconnected to one another by a plurality of network links, and each node is configured to perform multiple rounds of forwarding tree computations to distribute traffic load on one or more of the network links to the other nodes.

35 Claims, 7 Drawing Sheets

(56) References Cited

OTHER PUBLICATIONS

Fedyk, D et al. IS-IS Extensions Supporting IEEE 802.1aq Shortest Path Bridging. Draft. Internet Engineering Task Force. Jul. 6, 2010.

Farkas J, et al. Performance Analysis of Shortest Path Bridging Control Protocols. Global Telecommunications Conference. Nov. 30, 2009.

* cited by examiner

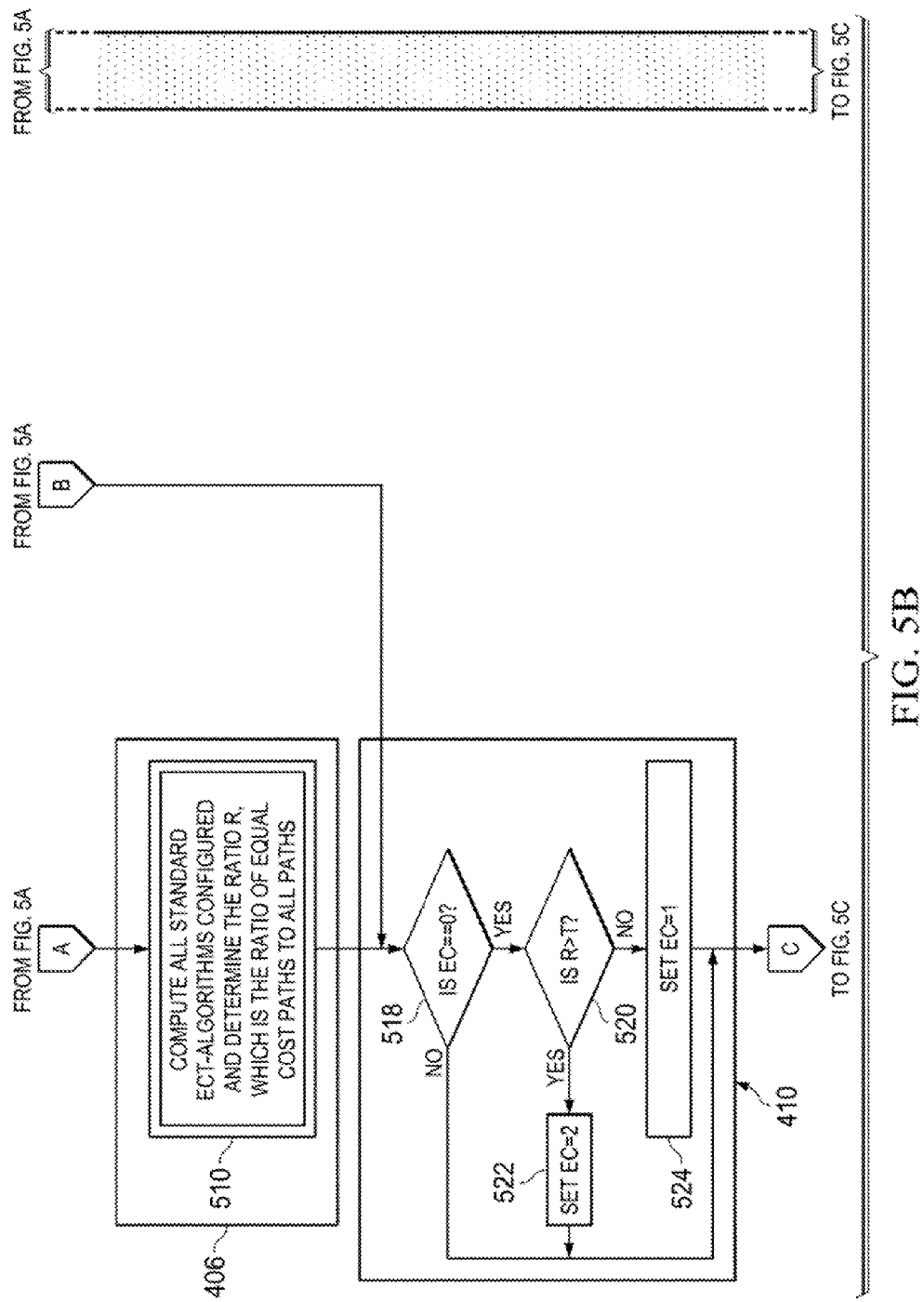

NODE AND METHOD FOR COMPUTING FORWARDING TREES TO DISTRIBUTE TRAFFIC IN A NETWORK

CLAIM OF PRIORITY

This application is a 371 of PCT/IB11/52849 filed on Jun. 28, 2011 and claims the benefit of U.S. Provisional Application Ser. No. 61/367,518 filed on Jul. 26, 2010. The contents of these documents are hereby incorporated by reference herein.

TECHNICAL FIELD

The present invention relates to a node and a method for computing forwarding trees to distribute traffic in a network. In addition, the present invention relates to a network comprising a plurality of nodes interconnected to one another by a plurality of network links, where each node is configured to perform multiple rounds of forwarding tree computations to distribute traffic load on one or more of the network links to the other nodes.

BACKGROUND

The following abbreviations and terms are herewith defined, at least some of which are referred to within the following description about the prior art and/or the present invention.

| | |
|---|---|
| CS | Convergence Sensitive |
| EC | Equal Costly |
| ECT | Equal Cost Tree |
| IEEE | Institute of Electrical and Electronics Engineers |
| I-SID | Backbone Service Identifier |
| IS-IS | Intermediate System to Intermediate System Routing Protocol |
| L | Load |
| LSP | Link State PDU |
| M | maximal rounds for auto configured opaque ECT-ALGORITHMs |
| MSTP | Multiple Spanning Tree Protocol |
| μP | microprocessor |
| OUI | Organizationally Unique Identifier |
| PDU | Protocol Data Unit |
| PBB | Provider Backbone Bridges |
| PBB-TE | Provider Backbone Bridge Traffic Engineering |
| QoS | Quality of Service |
| RSTP | Rapid Spanning Tree Protocol |
| Rx | Receive |
| SPB | Shortest Path Bridging |
| SPT | Shortest Path Tree |
| T | Threshold |
| Tx | Transmit |
| VID | VLAN Identifier |

Equal Cost Trees: Two trees are equal cost trees if they span from the same source node to the same set of destination nodes and they contain different paths having the same cost.

The ECT algorithm: The ECT algorithm is specified in IEEE Std. 802.1aq D2.5, "IEEE Standard for Local and Metropolitan Area Networks: Virtual Bridged Local Area Networks—Amendment 8: Shortest Path Bridging," January 2010. The ECT algorithm is a Dijkstra algorithm plus a tie-breaking for multiple equal cost shortest paths. It might happen that there are no equal cost paths in the network at all, then in this case all the ECT algorithms result in the same tree, which is not a real ECT as the different trees do not contain a different paths with equal cost path.

End-to-End Cost: Each link of the network has its own cost, also referred to as a metric. The end-to-end cost is the sum of link metrics along the path between the source node and the destination node. We talk about equal cost if there are Opaque ECT algorithm: The opaque ECT algorithm means that it is defined outside of IEEE 802.1aq.

Equal Costliness: Equal Costliness is an indicator on whether or not the topology of the network contains a lot of equal cost paths (e.g., more than 30% of the paths have equal cost to another path).

Path ID: Path ID is a sorted list (in ascending lexicographic order) of the IDs of the links that the path traverses, which is specified by IEEE 802.1aq. Having a prefix before the Path ID and setting the prefix based on a function of load as discussed below is not part of the standard.

There is a significant effort taking place today to enhance Ethernet networks so they are able to support carrier grade services and data center applications in addition to the many currently supported services and applications. In this regard, IEEE 802.1Qay PBB-TE "Provider Backbone Bridge Traffic Engineering" has been defined to support point-to-point and point-to-multipoint traffic engineered services. Furthermore, IEEE 802.1Qay PBB-TE has been defined to provide protection switching for point-to-point services thus making 50 ms failover time achievable. The contents of IEEE 802.1Qay PBB-TE are hereby incorporated herein by reference.

However, the only control protocols currently available for multipoint-to-multipoint services, which are also referred to as multipoint services, are RSTP and MSTP. Fortunately, there is an ongoing standardization project in IEEE known as Shortest Path Bridging (SPB) which defines a novel control protocol for bridged networks based on link state principles and in particular IS-IS. SPB not only supports multipoint services but also supports point-to-point services and point-to-multipoint services. This standardization project resulted in IEEE Std. 802.1aq D2.5, "IEEE Standard for Local and Metropolitan Area Networks: Virtual Bridged Local Area Networks—Amendment 8: Shortest Path Bridging," January 2010. The contents of IEEE Std. 802.1aq D2.5 also referred to herein as "SPB" or "the standard SPB" are hereby incorporated by reference.

The main goal of SPB is to use the shortest path for frame forwarding and thus improve the overall utilization of the network by using links which are otherwise blocked by the spanning tree protocols (e.g., RSTP, MSTP). Nevertheless, SPB does not currently implement Traffic Engineering which for example is used to determine forwarding paths for traffic flows to meet certain criteria such as meeting QoS requirements or avoiding network congestion.

In addition, in a SPB network there might be multiple paths with the same end-to-end cost between a pair of bridges (nodes). To meet the congruency requirements of Shortest Path Trees (SPTs), the Dijkstra algorithm used by IS-IS for shortest path computation is extended to include a tie-breaking rule. To enable the tie-breaking rule, a Path ID has been introduced which is a sorted list (in ascending lexicographic order) of IS-IS Bridge IDs that the path traverses including the endpoint nodes. The extended Dijkstra algorithm selects the path with the lowest Path ID from multiple equal cost paths. To take advantage of multiple equal cost paths, SPB defines 16 Bridge ID shuffling algorithms, thus different paths become the one having the lowest Path ID for the different algorithms. The SPTs comprised of equal cost paths are called Equal Cost Trees (ECT). The shuffling algorithm and thus the SPT Set computed with it is identified by a unique standard ECT-ALGORITHM comprised of an OUT and an 8-bit index value. A VLAN identified by a Base VID is then assigned to a standard ECT-ALGORITHM by means of configuration in the SPB network, i.e. the STP Set thus the forwarding paths used by a VLAN. Furthermore, an I-SID which is a backbone service identifier is then assigned to a Base VID in Provider Backbone Bridge (PBB) networks. The traffic assignment and spreading on the 16 SPT Sets is configurable by means management actions.

Referring to FIG. 1 (PRIOR ART), there is a diagram of an exemplary SPB network 100 which has multiple traditional nodes 102 interconnected to one another by multiple links 104. The diagram provides a visual representation of SPB's multi-path routing features where all 16 standard individual shortest paths (see highlighted links 104) are superimposed on the SPB network 100 between a given pair of nodes 102 (1st node 102 and 20th node 102). The existing SPB's solution is only able to take advantage of 16 equal cost paths, nevertheless the physical topology of the network 100 may provide more than 16 equal cost paths. Furthermore, the pseudo random 16 Bridge ID shuffling algorithms specified in SPB may result in hot links or hot nodes, which are overloaded or heavily loaded with traffic. That is it may happen that the traffic is not distributed as evenly on the links 104 of the network 100 as it would otherwise be possible without the hot links or hot nodes. In addition, it would be desirable to use each and every link 104 of the network 100 for traffic forwarding, which is not necessarily supported by SPB.

Furthermore, SPB requires the use of the shortest path which might not be the optimal path in the network 100 if the aim is to have a balanced utilization of the network links 104. In other words, the aim of traffic engineering is to create as much as possible a uniform distribution of the traffic in the network 100, for which the shortest path forwarding is not always the most expedient. Thus, traffic engineering may deviate from shortest path forwarding to some extent to achieve better overall network utilization, which is not supported by the current SPB. In addition to this, the use of multiple ECTs is not automatic since it has to be configured, thus traffic spreading requires management actions and planning in advance. In view of the foregoing, it can be seen that there has been and still is a need to address the aforementioned shortcomings and other shortcomings associated with the current SPB. This need and other needs are satisfied by the present invention.

SUMMARY

A node, a method and a network are described in the independent claims of the present application. Advantageous embodiments of the node, the method, and the network are described in the dependent claims.

In one aspect, the present invention provides a node for performing multiple rounds of forwarding tree computations to distribute traffic load on network links to other nodes in a network. The node comprises a processor and a memory that stores processor-executable instructions where the processor interfaces with the memory and executes the processor-executable instructions to: (a) perform a first round of forwarding tree computations to determine forwarding trees for convergence sensitive traffic using standard Equal Cost Tree (ECT)-ALGORITHMS; and (b) perform a second round of forwarding tree computations to determine forwarding trees for non-sensitive traffic using opaque ECT-ALGORITHMS which take into account characteristics of a physical topology of the network with respect to equal cost, wherein the opaque ECT-ALGORITHMS have an Organizationally Unique Identifier (OUI) which is different than an OUI of the standard ECT-ALGORITHMS. An advantage associated with the node is that is computes forwarding trees for the network while performing traffic engineering to achieve balanced link utilization in the network.

In another aspect, the present invention provides a method of performing multiple rounds of forwarding tree computations to distribute traffic load on network links between nodes in a network. The method which is implemented by each node comprises the steps of: (a) performing a first round of forwarding tree computations to determine forwarding trees for convergence sensitive traffic using standard Equal Cost Tree (ECT)-ALGORITHMS; and (b) performing a second round of forwarding tree computations to determine forwarding trees for non-sensitive traffic using opaque ECT-ALGORITHMS which take into account characteristics of a physical topology of the network with respect to equal cost, wherein the opaque ECT-ALGORITHMS have an Organizationally Unique Identifier (OUI) which is different than an OUI of the standard. ECT-ALGORITHMS. An advantage associated with the method is that is computes forwarding trees for the network while performing traffic engineering to achieve balanced link utilization in the network.

In yet another aspect, the present invention provides network which has multiple nodes interconnected to one another by multiple network links. Each node is configured to perform multiple rounds of forwarding tree computations to distribute traffic load one or more of the network links to the other nodes. In particular, each node comprises a processor and a memory that stores processor-executable instructions where the processor interfaces with the memory and executes the processor-executable instructions to: (a) perform a first round of forwarding tree computations to determine forwarding trees for convergence sensitive traffic using standard Equal Cost Tree (ECT)-ALGORITHMS; and (b) perform a second round of forwarding tree computations to determine forwarding trees for non-sensitive traffic using opaque ECT-ALGORITHMS which take into account characteristics of a physical topology of the network with respect to equal cost, wherein the opaque ECT-ALGORITHMS have an Organizationally Unique Identifier (OUI) which is different than an OUI of the standard ECT-ALGORITHMS. An advantage associated with each node computing forwarding trees for the network is that they also perform traffic engineering to achieve balanced link utilization in the network.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings:

FIGS. 5A-5D is a flowchart illustrating the detailed steps of an exemplary method that is implemented by the enhanced nodes shown in FIGS. 2 and 3 in accordance with an embodiment of the present invention.

DETAILED DESCRIPTION

Figure 1:
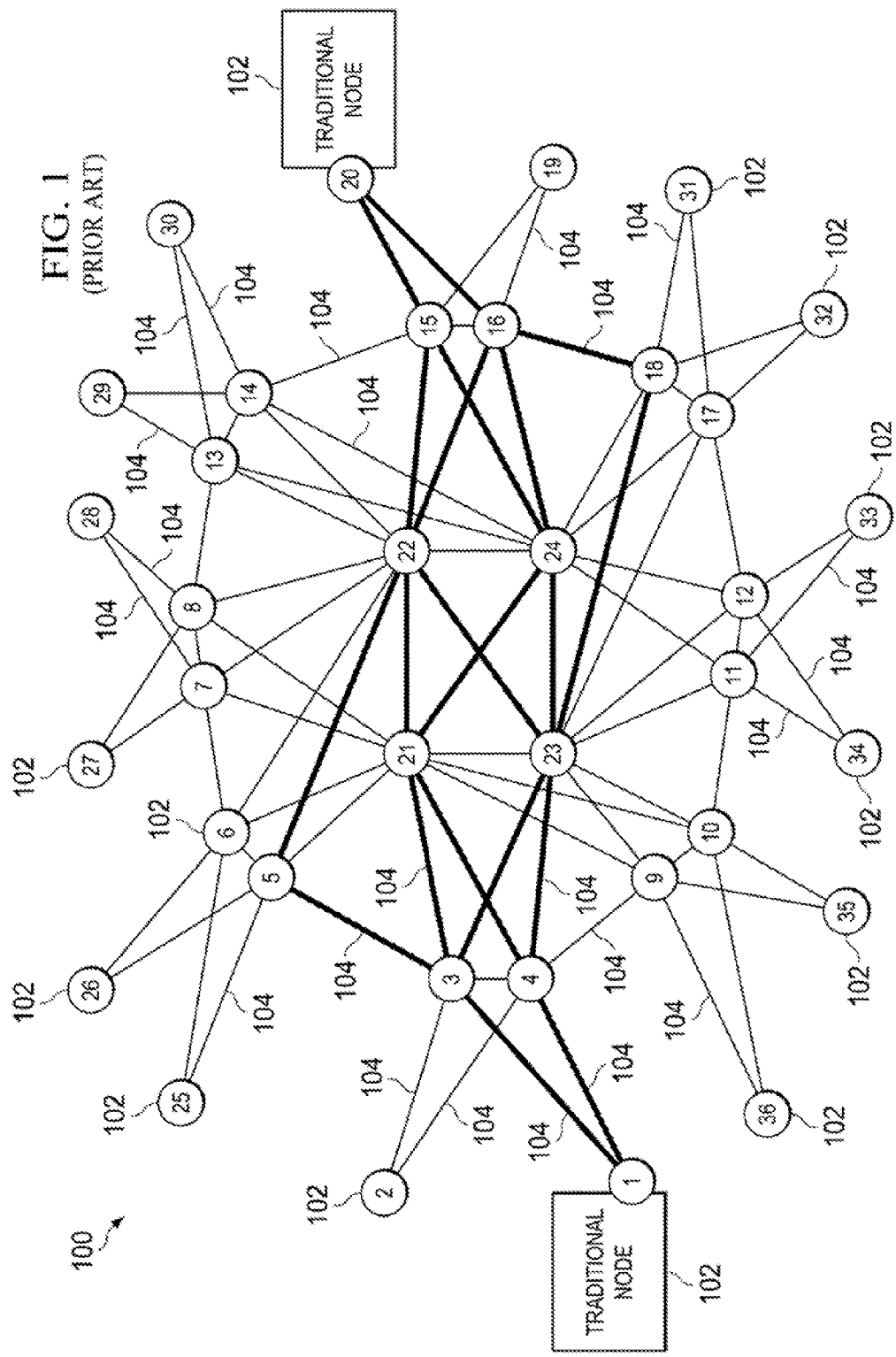
FIG. 1 (PRIOR ART) is a diagram of an exemplary SPB network which has multiple traditional nodes interconnected to one another by multiple links.
Figure 2:
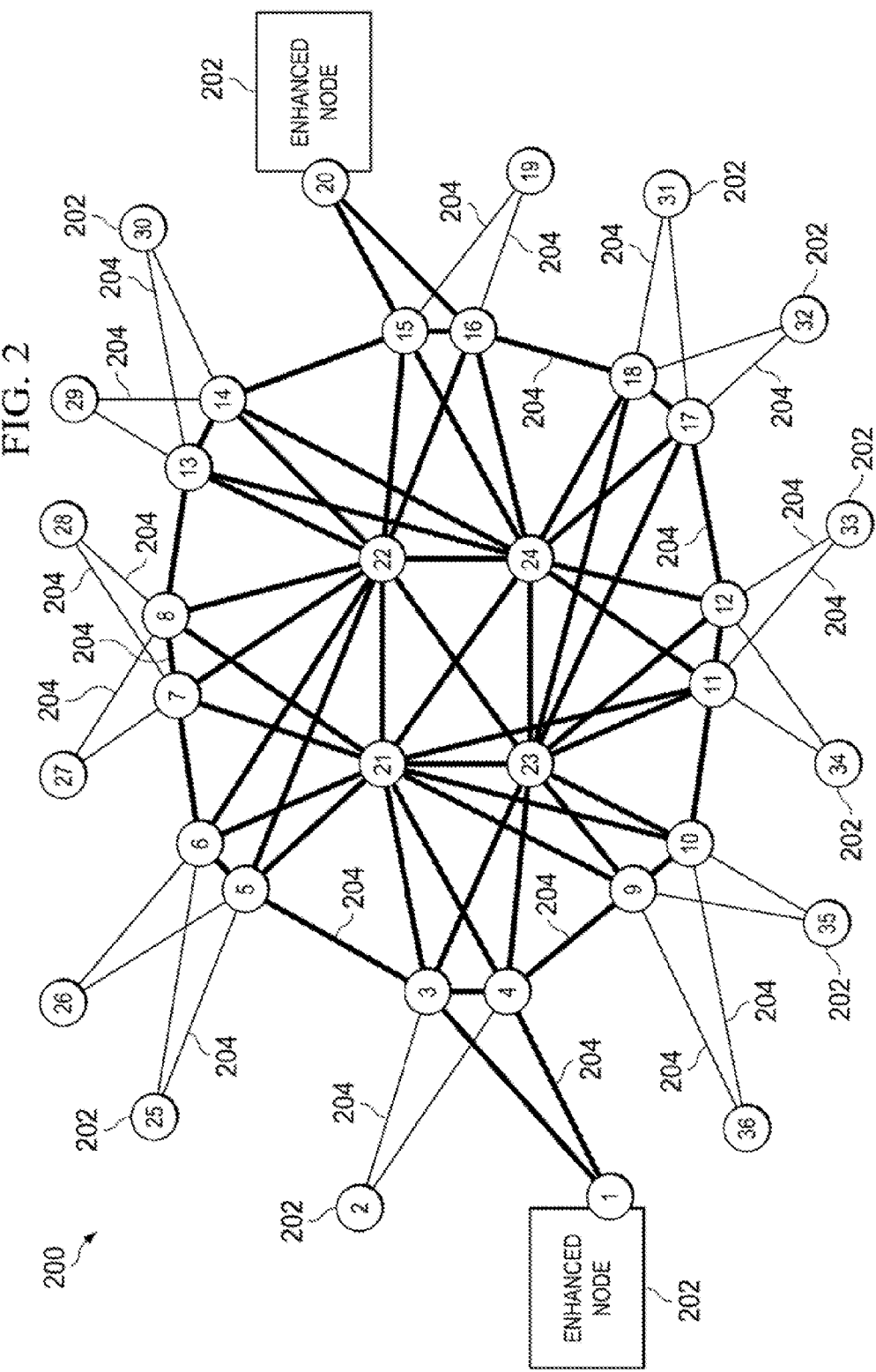
FIG. 2 is a diagram of an exemplary SPB network which has multiple enhanced nodes interconnected to one another by multiple links in accordance with an embodiment of the present invention.

Referring to FIG. 2, there is a diagram of an exemplary SPB network 200 which has multiple enhanced nodes 202 interconnected to one another by multiple links 204 in accordance with an embodiment of the present invention. The diagram provides a visual representation of the multi-path routing features in which all the possible paths (see highlighted links 204) made possible by the present invention are superimposed on the SPB network 100 between a given pair of enhanced nodes 202 (1st enhanced node 202 and 20th enhanced node 202). The skilled person will appreciate that the exemplary SPB network 200 includes many other components that are well known in the art but for clarity are not described herein while the enhanced node 202 which is relevant to the present invention is described in detail herein. In particular, a detailed description about the enhanced node 202 is provided next to explain how when the SPB network 200 has a change in physical topology such as a broken, removed or added link or node then all of the enhanced nodes 202 compute forwarding trees per the present invention to distribute traffic over one or more links 204 to other enhanced nodes 202.

Figure 3:
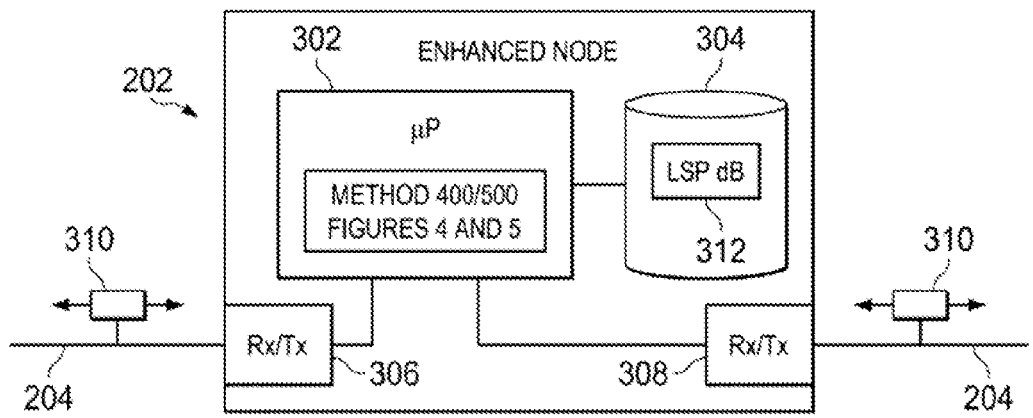
FIG. 3 is a diagram of the exemplary enhanced node shown in FIG. 2 in accordance with an embodiment of the present invention.

Referring to FIG. 3, there is a diagram of an exemplary enhanced node 202 configured to perform multiple rounds of forwarding tree computations to distribute traffic load on links 204 to other enhanced nodes 202 in accordance with an embodiment of the present invention. As shown, the exemplary enhanced node 202 (e.g., enhanced bridge 202) includes a processor 302 (central processing unit 302), a memory 304 (e.g., storage medium 304), a first network interface 306 (coupled to one of the links 204), and a second network interface 308 (coupled to one of the links 204). The processor 302 and the memory 304 can be implemented, at least partially, as software, firmware, hardware, or hard-coded logic. The enhanced node 202 is configured such that the network interfaces 306 and 308 receive and issue Link State Protocol Data Units 310 (LSPs 310) while the processor 302 constructs a LSP database 312 which is stored in the memory 304. Based on the LSP database 312, the processor 302 is able to determine when there has been a change in the physical topology of the network 200. If there is a change in the physical topology, then the processor 302 interfaces with the memory 304 and executes the processor-executable instructions stored therein to performs multiple rounds of forwarding tree computations pursuant to the method 400/500 described below and then uses the memory 304 for the storage of results and auxiliary data. The skilled person will appreciate that the enhanced node 202 includes many other components that are well known in the art but for clarity are not described herein while only the components 302, 304, 306, 308 and 312 which are relevant to the present invention are described in detail herein.

The method 400/500 uses multiple rounds of tree computation to evenly distribute the traffic load on network links 204. The results of a first tree computation round (based on convergence sensitive traffic) are immediately installed in the network 200 parallel to the computation of further trees in the second tree computation round (based on non-sensitive traffic). Thus, the method 400/500 distinguishes convergence sensitive traffic and non-sensitive traffic classes. For example, real-time traffic may be categorized as convergence sensitive traffic and best effort traffic may be categorized as non-sensitive traffic, where this categorization is according to the network operator's preferences. As such, the network convergence time for the convergence sensitive traffic per method 400/500 is same as the case of the standard SPB. However, the trees for traffic that is not that sensitive for convergence time are computed in the following round(s) such that the method 400/500 takes into account the characteristic of the physical topology with respect to equal cost and distributes traffic evenly in both cases, e.g., if the physical topology contains a lot of equal cost paths and in the case the physical topology does not contain a lot of equal cost paths. In this way, the method 400/500 performs automatic assignment of the traffic to tree sets while taking into account the convergence sensitivity and physical topology characteristics.

Figure 4:
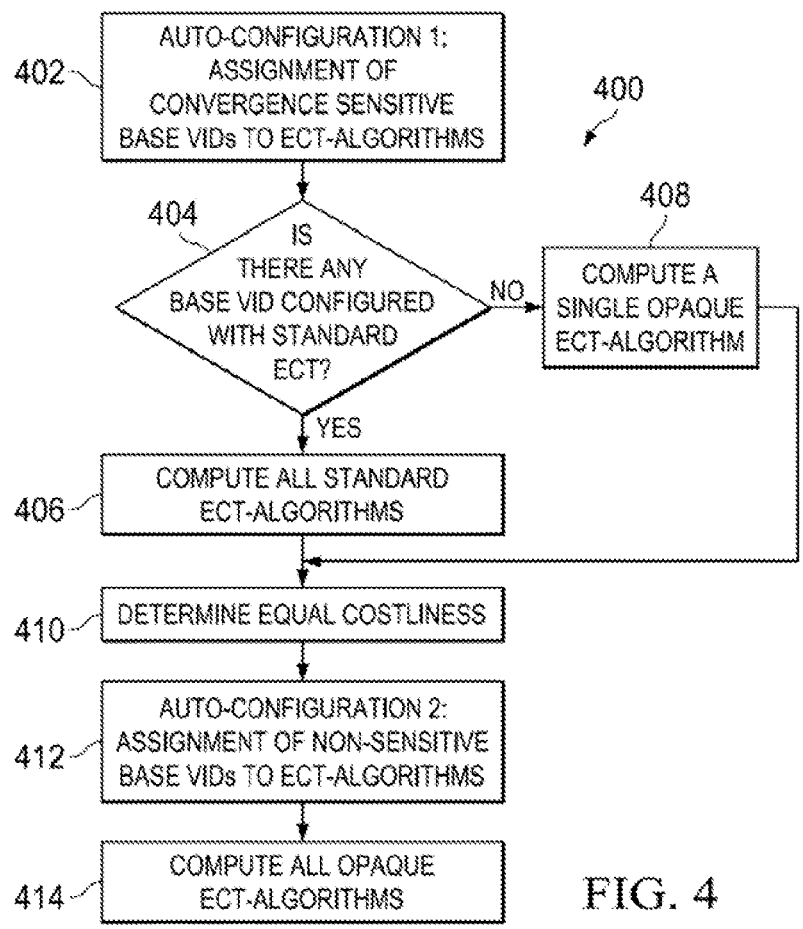
FIG. 4 is a flowchart illustrating the basic steps of an exemplary method which provides an overview of the method shown in FIG. 5 that is implemented by the enhanced nodes shown in FIGS. 2 and 3 in accordance with an embodiment of the present invention.
Figure 5A:
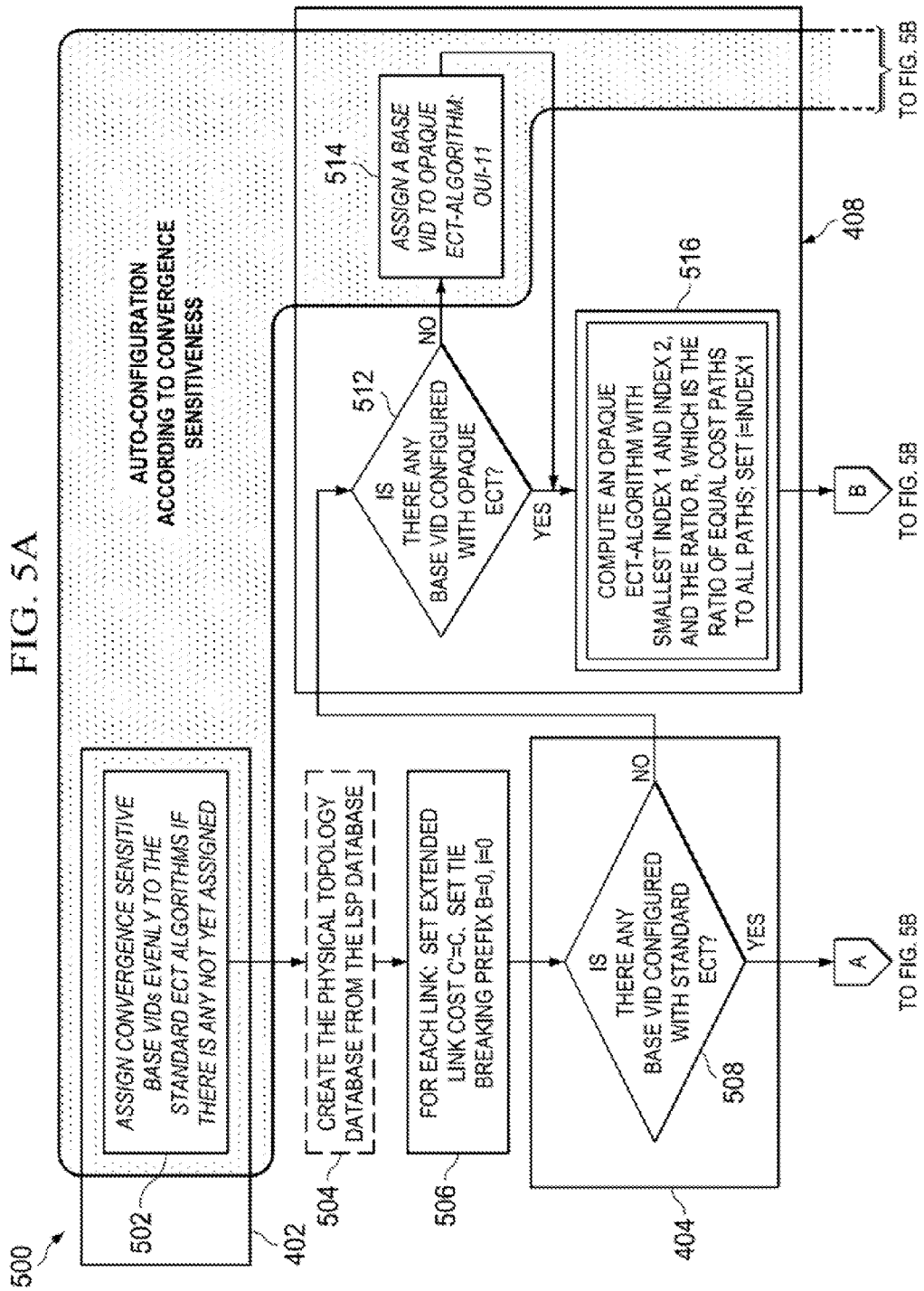
Figure 5C:
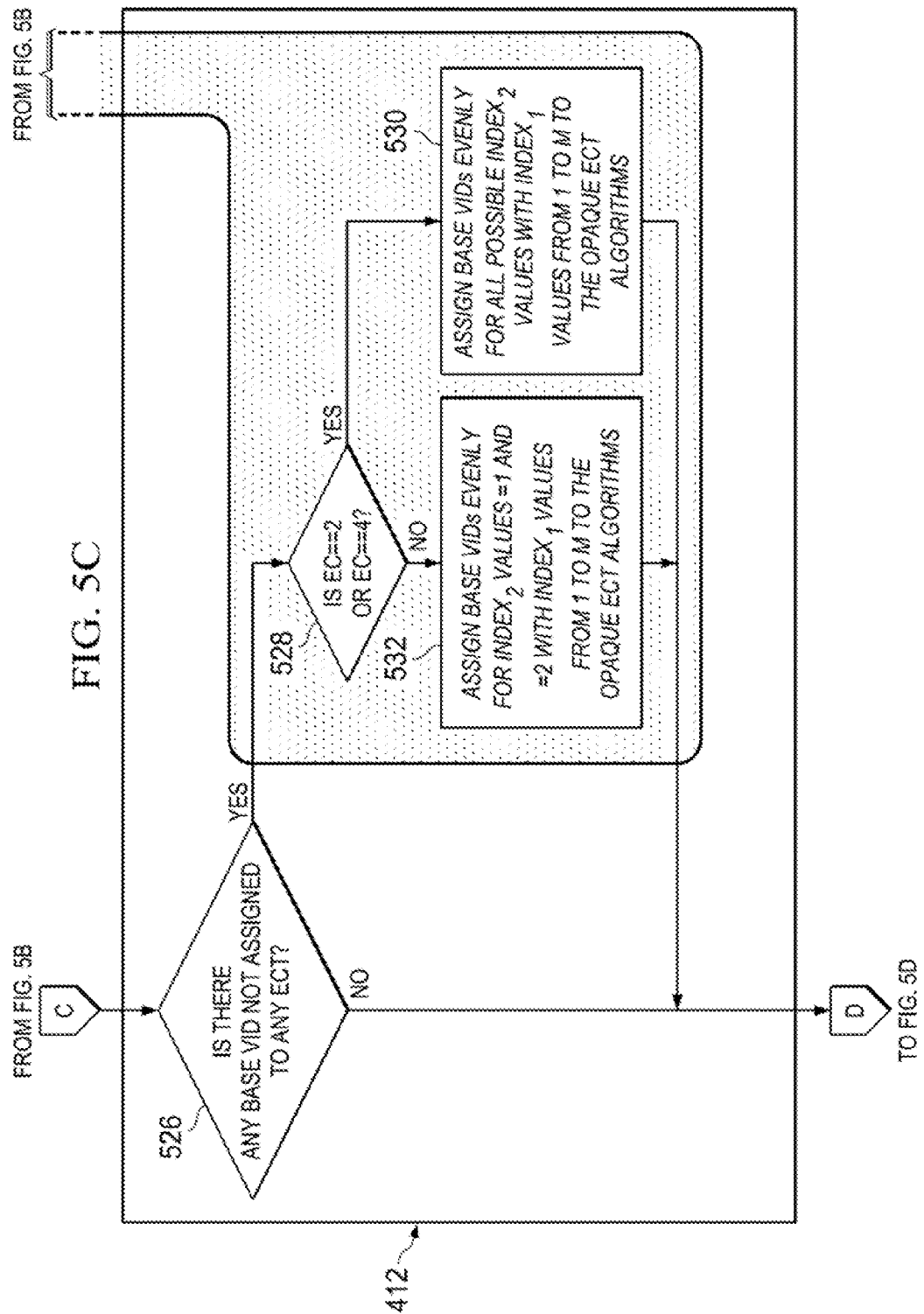
Figure 5D:
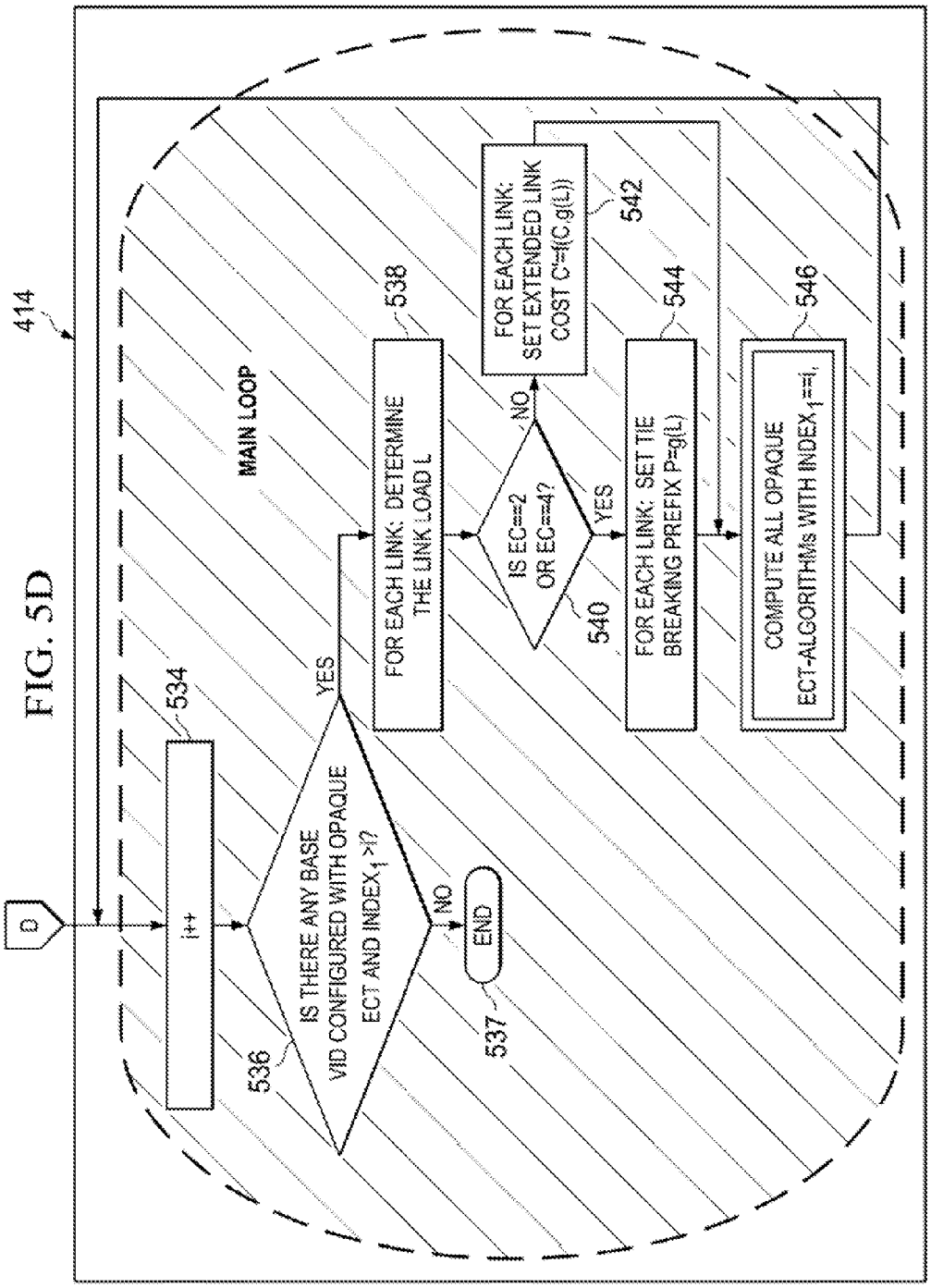

Referring to FIG. 4, there is a flowchart illustrating the basic steps of method 400 that provides an overview of method 500 which is described in greater detail below in accordance with an embodiment of the present invention. Each enhanced node 202 in the network 200 implements method 400/500 to provide successful frame or packet forwarding in the link-state network 200. Beginning in step 402, the auto-configuration for convergence sensitive traffic is performed such that they are assigned based on their Base VIDs to standard ECT-ALGORITHMs. At step 404, a determination is made to check if the standard ECT-ALGORITHM is in use by confirming if there are any Base VIDs configured with standard ECT-ALGORITHM. If the result of step 404 is yes, then in step 406 all the standard ECT-ALGORITHMS are computed in the first round such that the trees for the convergence sensitive traffic are determined. If no standard ECT-ALGORITHM is in use in step 404, then in step 408 a single opaque ECT-ALGORITHM is determined to have a picture of the physical topology. In this way, the method 400 is able to determine in step 410 whether or not the physical topology is equal costly. Assuming, the physical topology is equal costly then the non-sensitive traffic classes are assigned to the opaque ECT-ALGORITHMs in step 412 based on the equal costliness. At step 414, the opaque ECT-ALGORITHMs are computed in the second round such that the trees for the non-sensitive traffic are determined. The steps 402, 404, 406, 408, 410, 412 and 414 are also shown in the flowchart of method 500 to further help explain the present invention.

Referring to FIGS. 5A-5D, there is shown a flowchart illustrating the steps of the method 500 in accordance with an embodiment of the present invention. As mentioned above, each enhanced node 202 invokes the method 500 when there is a change in the physical topology of the network 200. Prior to describing the various steps of method 500 a brief overview is provided to help explain some of the relevant parameters and configurations related to method 500. As discussed above, the method 500 implements the computation of the forwarding trees in multiple rounds to be able to adapt to the physical topology of the network 200 and to distribute traffic evenly within the network 200. The shortest path tree sets determined by the standard ECT-ALGORITHMs are computed in the very first round if there is any Base VID assigned to any of the standard ECT-ALGORITHMs for these tree sets (steps 502, 504, 506 and 508). Then, the opaque ECT-ALGORITHMs are computed afterwards (steps 510, 512, 514 . . . 548). The current standard SPB opens up the possibility for the application of any ECT-ALGORITHM by means of introducing the opaque ECT-ALGORITHM. That is if the OUI differs from the standard ECT-ALGORITHM, then any algorithm can be used, one of which is specified in the present invention as the opaque ECT-ALGORITHM. During one round of computation the trees for each enhanced node 202 are computed and the trees belonging to different enhanced nodes 202 are computed with the same ECT-ALGORITHM to form a set of trees identified by an ECT-ALGORITHM.

The opaque ECT-ALGORITHM follows the identification structure specified in the SPB standard. That is, the opaque ECT-ALGORITHM has an OUI and an 8-bit Index. As the index is used to represent only 16 distinct values for the standard ECT-ALGORITHMs, it follows that this can be compressed to four bits for use with the present invention. Therefore, the index is split into two 4-bit sub-indexes for the opaque ECT-ALGORITHM as follows:

Index$_1$: defines in which round the ECT-ALGORITHM is computed

Index$_2$: defines the Bridge ID mask as specified in the standard SPB. Note: that 0001 defines the mask 0x00 and 0000 identifies mask 0xEE. Thus, index$_2$ is used to select a standard mask applied on the Bridge IDs.

The standard Bridge ID shuffling can be used for the opaque ECT-ALGORITHMs as well to minimize the number of computation rounds if it is aimed. Note: that during one computation round the trees belonging to all ECT-ALGORITHMS having same Index, are computed. There are as many computation rounds as many different Index, values. For example, there might be several computation rounds and within a round all the ECT-ALGORITHMS having the same Index, value are performed. The first round is for the standard ECT-ALGORITHMS, all the rest of the rounds are for the opaque ECT-ALGORITHMS.

The method 500 adapts to convergence time requirements. Therefore, convergence sensitive (CS) traffic, identified by Base VIDs or I-SIDs, is distinguished from traffic that is not that sensitive to network convergence time. The network operator may configure which traffic is the convergence sensitive traffic and which traffic is not by setting the CS flag for the corresponding Base VID or I-SID. The method 500 then assigns the Base VIDs accordingly to ECT-ALGORITHMs. Alternatively, the network operator may perform the assignment by direct configuration of Base VIDs to ECT-ALGORITHMs. In any case, the Convergence Sensitive Base VIDs are then assigned to the standard ECT-ALGORITHMS as specified in the SPB standard (see step 502). The non-convergence sensitive Base VIDs should be assigned to an opaque ECT-ALGORITHM. It should be appreciated that the auto-configuration steps highlighted in FIG. 5 namely steps 502, 514, 528, 530 and 532 are not invoked if the Base VIDs and I-SIDs are assigned to ECT-ALGORITHMs by management operations. As the trees for the convergence sensitive traffic are computed in the first computation round, their forwarding states can be installed immediately so the network convergence will be faster. If convergence sensitivity is not configured at all in either way, then all of the traffic is considered non-sensitive to convergence time.

After the first tree computation round, the method 500 makes a decision whether the physical topology of the network 200 is Equal Costly (EC) or not. (see steps 518, 520, 522 and 524). For example, the method 500 counts the number of equal cost decisions made during Dijkstra computation and divides it by the total number of paths. If this result is over a threshold (T), then the topology is considered as equal costly. Both T and EC are configurable parameters. The default value of T can be 30%. The values of EC can be interpreted as follows:

EC=0: no value, it is not decided yet, this is the default value

EC=1: automatically decided—non equal costly (under the threshold)

EC=2: automatically decided—equal costly (over the threshold)

EC=3: configured—non equal costly

EC=4: configured—equal costly

As discussed below, the link load (L) is a key parameter for achieving even link utilization thorough the entire network 200. The link load (L) is determined by the method 500 for each physical link 204 after each computation round and the method 500 accumulates the load of all the rounds that are already computed (see step 538). The link load (L) is then used by the method 500 to influence the trees computed in a later round such that less loaded links 204 are preferred to be included in a tree under computation (see steps 542 and 544). Thus, the load is spread more and more evenly on the links 204 as the number of computation rounds increase. In method 500, even two rounds may reach a quite balanced link utilization.

Another component used by method 500 to help achieve network load balancing is how the link load (L) is determined. To be compatible with IEEE 802.1 standards, the link load (L) is determined to be the number of trees into which the given link 204 is already included in former computation rounds. The standard topology layering structure can be kept this way because no higher topology layer information is used to determine the active topology, i.e. the forwarding trees. Nevertheless, the ISIS-SPB enhanced node 202 is aware of much more information, e.g. the assignment of Base VIDs to ECT-ALGORITHMS and the assignment of I-SIDs to Base VIDs. Hence, further information can be distributed within the network 200 if desired, e.g. even the traffic matrix or congestion information. Therefore, the link load (L) maybe determined based on other parameters as well, e.g. the number of Base VID or the number of I-SIDs or the offered load already carried on the link 204 if finer load balancing granularity is to be achieved. All these parameters can be incorporated and used by method 500 so it is possible to configure what is taken into account when the link load (L) is determined. To be able to smooth the effect of link load (L) and avoid extremity, the method 500 can use a Link Load Function g( ) to determine a modified link load L'=g(L). The default of the Link Load Function is L'=L. Nevertheless, the method 500 is configurable and other functions can be used, e.g. L'=L/avg(L) or L'=min(L)+L/avg(L).

The link cost (C) also influences the resulted trees. If the physical topology is not equal costly, i.e. EC=1 or EC=3, then hot links cannot be avoided by utilizing the equal cost paths as there are not that many equal costs paths. In this situation, the method 500 can then modify the originally configured link cost (C) according to the Link Cost Function f( ), such that C'=f(C,L) (see step 542). That is the original link cost (C) and the link load (L) are used, e.g. one of them becomes the integer part and the other one becomes the fraction part of the modified link cost (C'). The Link Cost Function is configurable as well and other functions can be used, e.g. C'=C/avg (C) or C'=min(C)+C/avg(C).

If equal cost paths dominate the topology, i.e. EC=2 or EC=4, then the original link cost (C) is not touched, but the Path ID used in Dijkstra tie-breaking is modified instead (see step 544). In method 500, the Path ID is the sorted list (in ascending lexicographic order) of the IDs of the links 204 that the path traverses, where the Link ID comprises a tie-breaking prefix P parameter and the Bridge ID of the bridges (e.g., 1, 3, 2 between endpoint nodes 202 1 and 3) it connects (in ascending lexicographic order). The tie-breaking prefix P has priority over the Bridge IDs, thus the load is used by the method 500 similarly to a link cost and the Bridge IDs are only used for further tie-breaking if needed. If desired, the modified Load parameter L' can be used as the tie-breaking prefix P in the Link ID, i.e. the result of the Link Load Function is used.

With the adjustments described above and using the multiple ECT algorithms, the usual Dijkstra calculation of forwarding paths can take place in such a way as to give different results each round. The aforementioned configuration parameters can be summarized as follows:

(I-SID)→Base VID→ECT-ALGORITHM assignments or at least categorization of Base VIDs (I-SIDs) according to convergence sensitivity, Default: non-sensitive Equal Costliness (EC)
 Default: EC=0: no value, it is not decided yet, this is the default value
 EC=3: configured—non equal costly
 EC=4: configured—equal costly
Equal costliness Threshold (T), Default: 30%
Link Load: Default=number of trees into which the given link is already included
Link Load Function g( ), Default: L'=L
Link Cost Function f( ), Default: C=integer, L=fraction
M: maximal rounds for auto configured opaque ECT-ALGORITHMs, i.e. the maximum of $Index_1$; Default: M=5

The default values ensure that the traffic engineering method 500 is invoked even with zero configurations.

Referring again to FIG. 5, the various steps of the tree computation method 500 are now described in detail in accordance with an embodiment of the present invention. As mentioned above, the auto-configuration steps 502, 514, 528, 530 and 540 are not invoked if the assignment of Base VIDs is configured. If it is not configured, i.e. only the convergence sensitivity is configured or even if that is not configured either, then the method 500 performs these assignments. In the assignment steps 502, 530 and 532, the Base VIDs are assigned as evenly as possible. The number of Base VIDs is divided by the number of available ECT-ALGORITHMS in all available rounds, i.e. in a single round for convergence sensitive Base VIDs and in M (maximal) rounds for non convergence sensitive Base VIDs. The Base VIDs are then sorted in increasing lexicographical order and as many are assigned to an ECT-ALGORITHM depending on the result of the previous division operation. Alternatively to FIG. 5, the auto-configuration steps can be separated from the tree computations. Especially if the only parameter connecting the two tasks, i.e. the equal costliness (EC) is configured.

As FIG. 5 shows after the assignment of convergence sensitive Base VIDs in step 502 if it is needed, step 504 which is optional is performed where the physical topology database is created from the LSP database 312. In step 504, a topology description maybe created based on the LSP database 312 to accelerate the computation of multiple rounds. In step 506, the variables are initialized which will be modified during the computation rounds. In particular in step 506, for each link 204 the extended link cost C'=C is initialized and the tie-breaking prefix B=0, i=0 is set.

It is then checked in step 508 whether there are any Base VIDs assigned to any of the standard ECT-ALGORITHMS. If yes, then the corresponding SPT Sets are computed in step 510. In particular, all standard ECT-ALGORITHMS are computed and the ratio R of equal cost paths to all the paths is determined as well in step 510, which is the $0^{th}$ computation.

If the outcome of step 508 is no, then it is checked in step 512 whether there is any Base VID assigned to an opaque ECT-ALGORITHM. If the outcome of step 508 is no, then all Base VIDs are non-sensitive to convergence time and there was no assignment thus a Base VID is assigned to the opaque ECT-ALGORITHM OUI-11 in step 514. Then after an affirmative step 512 or after step 514, the opaque ECT-ALGORITHM with smallest $Index_1$ and smallest $Index_2$ and the ratio R are computed in step 516 and also set $i=Index_1$.

Up to this point a computation round has been performed, there is at least a set of trees and the ratio R is computed. Thus, the method 500 is able to determine the equal costliness of the physical topology. In step 518, it is checked whether EC is already determined, i.e. configured, or not. If the value of EC differs from 0 in step 518, then EC should not be changed so proceed to the next step 526. If the value of EC is 0 in step 518, then R is compared to threshold T in step 520. If R>T, then the topology is equal costly, thus EC is set to 2 in step 522. If R<T, then EC is set to 1 in step 524 as the topology is not equal costly.

In step 526, it is checked whether there are still Base VIDs not assigned to any ECT-ALGORITHM. If yes, then it is further checked in step 528, whether the topology is equal costly or not, i.e. EC is either 2 or 4. If result of step 528 is yes, then it is advantageous to use ECT-ALGORITHMs that rely on equal cost paths, i.e. use all $Index_2$ values thus use all Bridge ID masks. Hence, the Base VIDs are then assigned to opaque ECT-ALGORITHMs evenly in step 530 such that M computation rounds are going to be performed, i.e. $Index_1$ varies from 1 to M. If the outcome of step 528 is no, then there is not that much room for playing with equal costs, thus two masks are only used, i.e. $Index_2$ with value 1 and value 2 are used while Index, which varies from 1 to M is used as well in step 532, where the Base VIDs are evenly assigned to opaque ECT-ALGORITHMs.

Up to this point, all necessary auto-configurations and the first round of tree computation have been performed by the method 500. Therefore, the method 500 after a negative result of step 526 or after step 532, enters its main loop for the further computation rounds at step 534, where variable I reflecting the number of the actual computation round is increased.

In step 536, it is checked whether there are any more ECT-ALGORITHMs to be computed. If no, then at step 537 it is the end of the method 500. If yes, then the cumulated link load (L) is determined for each link 204 in step 538. Then, in step 540 the equal costliness is checked to determine if EC=2 or EC=4. If the result of step 540 is no, then the link costs are updated in step 542 where for each link 204 there is set an extended link cost C'=f (C, g(L)). If the result of step 540 is yes, then the tie-breaking prefix is updated for each link 204 in step 544 such that the result of the Link Load Function g( ) is used. For instance, in step 544 a prefix can be concatenated in front of the Path ID used for tie-breaking and the tie-breaking prefix is updated such that a result of a link load function is used. After steps 542 and 544, the opaque ECT-ALGORITHMs belonging to this round of computation ($i=Index_1$) are computed in step 546. In FIG. 5, it should be noted that the computation round steps 510, 516, and 546 are indicated with duplicate frames. After step 546, the process proceeds back to step 534.

From the foregoing, one skilled in the art will appreciate that the present invention includes the enhanced node 202 and the method 400/500 for computing forwarding trees to distribute traffic in the network 200. Basically, the method 400/

500 involves using an Dijkstra algorithm which is extended with the low Path ID tie-breaking decision shortest path computation. Thus, if the topology of the network 200 has a lot of equal cost paths (e.g., more than 30% of the paths have equal cost), then the enhanced nodes 202 by implementing method 400/500 adjusts the tie breaking values to achieve better load distribution. If there are a few equal cost paths (e.g., less than 30% of the paths have equal cost) or maybe no equal cost path at all, then the enhanced nodes 202 by implementing method 400/500 adjusts the link cost to achieve better load distribution. In this way, the enhanced nodes 304 by implementing method 400/500 are able to take into account the topology characteristics, which happens to be implemented by using the Equal Costliness parameter. As discussed above, each enhanced node 202 implements the same method 400/500 to provide successful frame or packet forwarding in the network 200. The method 400/500 has several advantages some of which are as follows:

The method 400/500 computes the forwarding trees for an SPB network 200 such that it performs traffic engineering to achieve balanced link utilization in the network 200.

The method 400/500 meets all congruency requirements of SPB networks 300.

The method 400/500 is able to perform auto-configuration steps if traffic to tree assignment is not configured by network management.

Although one embodiment of the present invention has been illustrated in the accompanying Drawings and described in the foregoing Detailed Description, it should be understood that the invention is not limited to the disclosed embodiment, but instead is also capable of numerous rearrangements, modifications and substitutions without departing from the present invention that as has been set forth and defined within the following claims.

The invention claimed is:

1. A node for performing multiple rounds of forwarding tree computations to distribute traffic load on network links to other nodes in a network, the node comprising:
   a processor; and
   a memory that stores processor-executable instructions where the processor interfaces with the memory and executes the processor-executable instructions to:
      perform a first round of forwarding tree computations to determine forwarding trees for convergence sensitive traffic using standard Equal Cost Tree (ECT)-ALGORITHMS;
      perform a second round of forwarding tree computations to determine forwarding trees for non-sensitive traffic using opaque ECT-ALGORITHMS which take into account characteristics of a physical topology of the network with respect to equal cost, wherein the opaque ECT-ALGORITHMS have an Organizationally Unique Identifier (OUI) which is different than an OUI of the standard ECT-ALGORITHMS;
      determine a cumulative link load for each network link after performing the first round of forwarding tree computations to determine the forwarding trees for the convergence sensitive traffic using the standard ECT-ALGORITHMS and then utilize the determined cumulative link loads when performing the second round of forwarding tree computations to determine the forwarding trees for the non-sensitive traffic using the opaque ECT-ALGORITHMS; and
   wherein each opaque ECT-ALGORITHM further includes a first four bit index and a second four bit index, wherein the first four bit index defines in which round the corresponding opaque ECT-ALGORITHM is computed and the second four bit index is used to select a standard mask applied on Bridge IDs.

2. A node for performing multiple rounds of forwarding tree computations to distribute traffic load on network links to other nodes in a network, the node comprising:
   a processor; and
   a memory that stores processor-executable instructions where the processor interfaces with the memory and executes the processor-executable instructions to:
      perform a first round of forwarding tree computations to determine forwarding trees for convergence sensitive traffic using standard Equal Cost Tree (ECT)-ALGORITHMS;
      perform a second round of forwarding tree computations to determine forwarding trees for non-sensitive traffic using opaque ECT-ALGORITHMS which take into account characteristics of a physical topology of the network with respect to equal cost, wherein the opaque ECT-ALGORTHIMS have an Organizationally Unique Identifier (OUI) which is different than an OUI of the standard ECT-ALGORITHMS, wherein the processor conducts the second performing operation by:
         computing a single opaque ECT-ALGORITHM to represent the physical topology of the network;
         determining equal costliness of the physical topology of the network;
         assigning the non-sensitive traffic to the opaque ECT-ALGORITHMS based on equal costliness; and
         computing the forwarding trees for the non-sensitive traffic using opaque ECT-ALGORITHMS which take into account characteristics of the physical topology with respect to the equal cost; and
      wherein the single opaque ECT-ALGORITHM has a smallest first four bit index and a smallest second four bits when compared to the opaque ECT-ALGORITHMS which means the single opaque ECT-ALGORITHM is computed before the other opaque ECT-ALGORITHMS; and
      determine a cumulative link load for each network link after performing the first round of forwarding tree computations to determine the forwarding trees for the convergence sensitive traffic using the standard ECT-ALGORITHMS and then utilize the determined cumulative link loads when performing the second round of forwarding tree computations to determine the forwarding trees for the non-sensitive traffic using the opaque ECT-ALGORITHMS.

3. A node for performing multiple rounds of forwarding tree computations to distribute traffic load on network links to other nodes in a network, the node comprising:
   a processor; and
   a memory that stores processor-executable instructions where the processor interfaces with the memory and executes the processor-executable instructions to:
      perform a first round of forwarding tree computations to determine forwarding trees for convergence sensitive traffic using standard Equal Cost Tree (ECT)-ALGORITHMS;
      perform a second round of forwarding tree computations to determine forwarding trees for non-sensitive traffic using opaque ECT-ALGORITHMS which take into account characteristics of a physical topology of the network with respect to equal cost, wherein the opaque ECT-ALGORTHIMS have an Organizationally Unique Identifier (OUI) which is different than an OUI of the standard ECT-ALGORITHMS, wherein the processor conducts the second performing operation by:
  computing a single opaque ECT-ALGORITHM to represent the physical topology of the network;
  determining equal costliness of the physical topology of the network;
  assigning the non-sensitive traffic to the opaque ECT-ALGORITHMS based on equal costliness; and
  computing the forwarding trees for the non-sensitive traffic using opaque ECT-ALGORITHMS which take into account characteristics of the physical topology with respect to the equal cost, wherein the processor computes the forwarding trees for the non-sensitive traffic using opaque ECT-ALGORITHMS by:
determining a link load for each network link;
if the physical topology is not equal costly, then generating a modified link cost based on an originally configured link cost and the link load for each network link; or
if the physical topology is equal costly, then concatenating a prefix in front of a Path ID used for tie-breaking and updating the tie-breaking prefix such that a result of a link load function is used, wherein the Path ID is a sorted list of IDs of the network links that a path traverses; and
using the link loads and either the modified link costs and the updated tie-breaking prefix when computing the forwarding trees; and
determine a cumulative link load for each network link after performing the first round of forwarding tree computations to determine the forwarding trees for the convergence sensitive traffic using the standard ECT-ALGORITHMS and then utilize the determined cumulative link loads when performing the second round of forwarding tree computations to determine the forwarding trees for the non-sensitive traffic using the opaque ECT-ALGORITHMS.

4. The node of claim 3, wherein the link load for each network link is the number of forwarding trees into which the given network link is already included in during the first performing step.

5. The node of claim 4, wherein the link load for each network link is further based on a number of Base VIDs or I-SIDs carried or the traffic transmitted of congestion information.

6. The node of claim 3, wherein the link load is based on a modified link load to smooth an effect of the link load on the computed forwarding tress for the non-sensitive traffic.

7. A method of performing multiple rounds of forwarding tree computations to distribute traffic load on network links between nodes in a network, the method implemented by each node comprising the steps of:
  performing, by each node, a first round of forwarding tree computations to determine forwarding trees for convergence sensitive traffic using standard Equal Cost Tree (ECT)-ALGORITHMS;
  performing, by each node, a second round of forwarding tree computations to determine forwarding trees for non-sensitive traffic using opaque ECT-ALGORITHMS which take into account characteristics of a physical topology of the network with respect to equal cost, wherein the opaque ECT-ALGORTHIMS have an Organizationally Unique Identifier (OUI) which is different than an OUI of the standard ECT-ALGORITHMS;
  determining, by each node, a cumulative link load for each network link after performing the first round of forwarding tree computations to determine the forwarding trees for the convergence sensitive traffic using the standard ECT-ALGORITHMS and then utilizing the determined cumulative link loads when performing the second round of forwarding tree computations to determine the forwarding trees for the non-sensitive traffic using the opaque ECT-ALGORITHMS;
  using, by each node, the forwarding trees computed in the first round to route the convergence sensitive traffic in the network, and further using the forwarding trees computed in the second round to route the non-sensitive traffic in the network; and
  wherein each opaque ECT-ALGORITHM further includes a first four bit index and a second four bit index, wherein the first four bit index defines in which round the corresponding opaque ECT-ALGORITHM is computed and the second four bit index is used to select a standard mask applied on Bridge IDs.

8. A method of performing multiple rounds of forwarding tree computations to distribute traffic load on network links between nodes in a network, the method implemented by each node comprising the steps of:
  performing, by each node, a first round of forwarding tree computations to determine forwarding trees for convergence sensitive traffic using standard Equal Cost Tree (ECT)-ALGORITHMS;
  performing, by each node, a second round of forwarding tree computations to determine forwarding trees for non-sensitive traffic using opaque ECT-ALGORITHMS which take into account characteristics of a physical topology of the network with respect to equal cost, wherein the opaque ECT-ALGORTHIMS have an Organizationally Unique Identifier (OUI) which is different than an OUI of the standard ECT-ALGORITHMS, wherein the second performing step further includes the steps of:
    computing a single opaque ECT-ALGORITHM to represent the physical topology of the network;
    determining equal costliness of the physical topology of the network;
    assigning the non-sensitive traffic to the opaque ECT-ALGORITHMS based on equal costliness; and
    computing the forwarding trees for the non-sensitive traffic using opaque ECT-ALGORITHMS which take into account characteristics of the physical topology with respect to equal cost; and
    wherein the single opaque ECT-ALGORITHM has a smallest first four bit index and a smallest second four bits when compared to the opaque ECT-ALGORITHMS which means the single opaque ECT-ALGORITHM is computed before the other opaque ECT-ALGORITHMS; and
  determining, by each node, a cumulative link load for each network link after performing the first round of forwarding tree computations to determine the forwarding trees for the convergence sensitive traffic using the standard ECT-ALGORITHMS and then utilizing the determined cumulative link loads when performing the second round of forwarding tree computations to determine the forwarding trees for the non-sensitive traffic using the opaque ECT-ALGORITHMS; and
  using, by each node, the forwarding trees computed in the first round to route the convergence sensitive traffic in the network, and further using the forwarding trees computed in the second round to route the non-sensitive traffic in the network.

9. A method of performing multiple rounds of forwarding tree computations to distribute traffic load on network links between nodes in a network, the method implemented by each node comprising the steps of:

performing, by each node, a first round of forwarding tree computations to determine forwarding trees for convergence sensitive traffic using standard Equal Cost Tree (ECT)-ALGORITHMS;

performing, by each node, a second round of forwarding tree computations to determine forwarding trees for non-sensitive traffic using opaque ECT-ALGORITHMS which take into account characteristics of a physical topology of the network with respect to equal cost, wherein the opaque ECT-ALGORTHIMS have an Organizationally Unique Identifier (OUI) which is different than an OUI of the standard ECT-ALGORITHMS, wherein the second performing step further includes the steps of:

computing a single opaque ECT-ALGORITHM to represent the physical topology of the network;

determining equal costliness of the physical topology of the network;

assigning the non-sensitive traffic to the opaque ECT-ALGORITHMS based on equal costliness; and computing the forwarding trees for the non-sensitive traffic using opaque ECT-ALGORITHMS which take into account characteristics of the physical topology with respect to equal cost, wherein the step of computing the forwarding trees for the non-sensitive traffic using the opaque ECT-ALGORITHMS further includes the steps of:

determining a link load for each network link;

if the physical topology is not equal costly, then generating a modified link cost based on an originally configured link cost and the link load for each network link; or if the physical topology is equal costly, then concatenating a prefix in front of a Path ID used for tie-breaking and updating the tie-breaking prefix such that a result of a link load function is used, wherein the Path ID is a sorted list of IDs of the network links that a path traverses; and using the link loads and either the modified link costs and the updated tie-breaking prefix when computing the forwarding trees; and determining, by each node, a cumulative link load for each network link after performing the first round of forwarding tree computations to determine the forwarding trees for the convergence sensitive traffic using the standard ECT-ALGORITHMS and then utilizing the determined cumulative link loads when performing the second round of forwarding tree computations to determine the forwarding trees for the non-sensitive traffic using the opaque ECT-ALGORITHMS; and using, by each node, the forwarding trees computed in the first round to route the convergence sensitive traffic in the network, and further using the forwarding trees computed in the second round to route the non-sensitive traffic in the network.

10. The method of claim 9, wherein the link load for each network link is the number of forwarding trees into which the given network link is already included in during the first performing step.

11. The method of claim 10, wherein the link load for each network link is further based on a number of Base VIDs or I-SIDs carried or the traffic transmitted of congestion information.

12. The method of claim 9, wherein the link load is based on a modified link load to smooth an effect of the link load on the computed forwarding tress for the non-sensitive traffic.

13. A network comprising:

a plurality of nodes interconnected to one another by a plurality of network links, each node is configured to perform multiple rounds of forwarding tree computations to distribute traffic load one or more of the network links to the other nodes, each node comprises:

a processor; and a memory that stores processor-executable instructions where the processor interfaces with the memory and executes the processor-executable instructions to:

perform a first round of forwarding tree computations to determine forwarding trees for convergence sensitive traffic using standard Equal Cost Tree (ECT)-ALGORITHMS; and perform a second round of forwarding tree computations to determine forwarding trees for non-sensitive traffic using opaque ECT-ALGORITHMS which take into account characteristics of a physical topology of the network with respect to equal cost, wherein the opaque ECT-ALGORITHMS have an Organizationally Unique Identifier (OUI) which is different than an OUI of the standard ECT-ALGORITHMS;

determine a cumulative link load for each network link after performing the first round of forwarding tree computations to determine the forwarding trees for the convergence sensitive traffic using the standard ECT-ALGORITHMS, and then utilize the determined cumulative link loads when performing the second round of forwarding tree computations to determine the forwarding trees for the non-sensitive traffic using the opaque ECT-ALGORITHMS; and wherein each opaque ECT-ALGORITHM further includes a first four bit index and a second four bit index, wherein the first four bit index defines in which round the corresponding opaque ECT-ALGORITHM is computed and the second four bit index is used to select a standard mask applied on Bridge IDs.

14. A node for performing multiple rounds of forwarding tree computations to distribute traffic load on network links to other nodes in a network, the node comprising:

a processor; and a memory that stores processor-executable instructions where the processor interfaces with the memory and executes the processor-executable instructions to:

perform a first round of forwarding tree computations to determine forwarding trees for convergence sensitive traffic using standard Equal Cost Tree (ECT)-ALGORITHMS;

perform a second round of forwarding tree computations to determine forwarding trees for non-sensitive traffic using opaque ECT-ALGORITHMS which take into account characteristics of a physical topology of the network with respect to equal cost, wherein the opaque ECT-ALGORITHMS have an Organizationally Unique Identifier (OUI) which is different than an OUI of the standard ECT-ALGORITHMS; and wherein each opaque ECT-ALGORITHM further includes a first four bit index and a second four bit index, wherein the first four bit index defines in which round the corresponding opaque ECT-ALGORITHM is computed and the second four bit index is used to select a standard mask applied on Bridge IDs.

15. The node of claim 14, wherein the processor performs the first performing operation before the second performing operation and the forwarding trees computed for the convergence sensitive traffic are immediately installed such that network convergence for the convergence sensitive traffic is faster than network convergence for the non-sensitive traffic.

16. The node of claim 14, wherein the processor conducts the first performing operation by:
assigning the convergence sensitive traffic to the standard ECT-ALGORITHMS based on identification numbers (I-SID) of the convergence sensitive traffic; and
computing the forwarding trees for the convergence sensitive traffic using standard Equal Cost Tree (ECT)-ALGORITHMS.

17. The node of claim 16, wherein the convergence sensitive traffic is assigned to the standard ECT-ALGORITHMS by management operations or an auto-configuration process.

18. The node of claim 14, wherein the processor conducts the second performing operation by:
computing a single opaque ECT-ALGORITHM to represent the physical topology of the network;
determining equal costliness of the physical topology of the network;
assigning the non-sensitive traffic to the opaque ECT-ALGORITHMS based on equal costliness; and
computing the forwarding trees for the non-sensitive traffic using opaque ECT-ALGORITHMS which take into account characteristics of the physical topology with respect to the equal cost.

19. The node of claim 14, wherein the convergence sensitive traffic is real-time traffic and the non-sensitive traffic is best effort traffic.

20. A node for performing multiple rounds of forwarding tree computations to distribute traffic load on network links to other nodes in a network, the node comprising:
a processor; and
a memory that stores processor-executable instructions where the processor interfaces with the memory and executes the processor-executable instructions to:
perform a first round of forwarding tree computations to determine forwarding trees for convergence sensitive traffic using standard Equal Cost Tree (ECT)-ALGORITHMS;
perform a second round of forwarding tree computations to determine forwarding trees for non-sensitive traffic using opaque ECT-ALGORITHMS which take into account characteristics of a physical topology of the network with respect to equal cost, wherein the opaque ECT-ALGORTHIMS have an Organizationally Unique Identifier (OUI) which is different than an OUI of the standard ECT-ALGORITHMS; and
wherein the processor conducts the second performing operation by:
computing a single opaque ECT-ALGORITHM to represent the physical topology of the network;
determining equal costliness of the physical topology of the network;
assigning the non-sensitive traffic to the opaque ECT-ALGORITHMS based on equal costliness; and
computing the forwarding trees for the non-sensitive traffic using opaque ECT-ALGORITHMS which take into account characteristics of the physical topology with respect to the equal cost; and
wherein the single opaque ECT-ALGORITHM has a smallest first four bit index and a smallest second four bits when compared to the opaque ECT-ALGORITHMS which means the single opaque ECT-ALGORITHM is computed before the other opaque ECT-ALGORITHMS.

21. A node for performing multiple rounds of forwarding tree computations to distribute traffic load on network links to other nodes in a network, the node comprising:
a processor; and
a memory that stores processor-executable instructions where the processor interfaces with the memory and executes the processor-executable instructions to:
perform a first round of forwarding tree computations to determine forwarding trees for convergence sensitive traffic using standard Equal Cost Tree (ECT)-ALGORITHMS; and
perform a second round of forwarding tree computations to determine forwarding trees for non-sensitive traffic using opaque ECT-ALGORITHMS which take into account characteristics of a physical topology of the network with respect to equal cost, wherein the opaque ECT-ALGORITHMS have an Organizationally Unique Identifier (OUI) which is different than an OUI of the standard ECT-ALGORITHMS; and
wherein the processor conducts the second performing operation by:
computing a single opaque ECT-ALGORITHM to represent the physical topology of the network;
determining equal costliness of the physical topology of the network;
assigning the non-sensitive traffic to the opaque ECT-ALGORITHMS based on equal costliness; and
computing the forwarding trees for the non-sensitive traffic using opaque ECT-ALGORITHMS which take into account characteristics of the physical topology with respect to the equal cost; and
wherein the processor computes the forwarding trees for the non-sensitive traffic using opaque ECT-ALGORITHMS by:
determining a link load for each network link;
if the physical topology is not equal costly, then generating a modified link cost based on an originally configured link cost and the link load for each network link; or
if the physical topology is equal costly, then concatenating a prefix in front of a Path ID used for tie-breaking and updating the tie-breaking prefix such that a result of a link load function is used, wherein the Path ID is a sorted list of IDs of the network links that a path traverses;
using the link loads and either the modified link costs and the updated tie-breaking prefix when computing the forwarding trees.

22. The node of claim 21, wherein the link load for each network link is the number of forwarding trees into which the given network link is already included in during the first performing step.

23. The node of claim 22, wherein the link load for each network link is further based on a number of Base VIDs or I-SIDs carried or the traffic transmitted of congestion information.

24. The node of claim 21, wherein the link load is based on a modified link load to smooth an effect of the link load on the computed forwarding tress for the non-sensitive traffic.

25. A method of performing multiple rounds of forwarding tree computations to distribute traffic load on network links between nodes in a network, the method implemented by each node comprising the steps of:
- performing, by each node, a first round of forwarding tree computations to determine forwarding trees for convergence sensitive traffic using standard Equal Cost Tree (ECT)-ALGORITHMS;
- performing, by each node, a second round of forwarding tree computations to determine forwarding trees for non-sensitive traffic using opaque ECT-ALGORITHMS which take into account characteristics of a physical topology of the network with respect to equal cost, wherein the opaque ECT-ALGORITHMS have an Organizationally Unique Identifier (OUI) which is different than an OUI of the standard ECT-ALGORITHMS;
- using, by each node, the forwarding trees computed in the first round to route the convergence sensitive traffic in the network, and further using the forwarding trees computed in the second round to route the non-sensitive traffic in the network; and
- wherein each opaque ECT-ALGORITHM further includes a first four bit index and a second four bit index, wherein the first four bit index defines in which round the corresponding opaque ECT-ALGORITHM is computed and the second four bit index is used to select a standard mask applied on Bridge IDs.

26. The method of claim 25, wherein the first performing step is performed before the second performing step and the forwarding trees computed for the convergence sensitive traffic are immediately installed such that network convergence for the convergence sensitive traffic is faster than network convergence for the non-sensitive traffic.

27. The method of claim 25, wherein the first performing step further includes the steps of:
- assigning the convergence sensitive traffic to the standard ECT-ALGORITHMS based on identification numbers (I-SID) of the convergence sensitive traffic; and
- computing the forwarding trees for the convergence sensitive traffic using standard Equal Cost Tree (ECT)-ALGORITHMS.

28. The method of claim 27, wherein the convergence sensitive traffic is assigned to the standard ECT-ALGORITHMS by management operations or an auto-configuration process.

29. The method of claim 25, wherein the second performing step further includes the steps of:
- computing a single opaque ECT-ALGORITHM to represent the physical topology of the network;
- determining equal costliness of the physical topology of the network;
- assigning the non-sensitive traffic to the opaque ECT-ALGORITHMS based on equal costliness; and
- computing the forwarding trees for the non-sensitive traffic using opaque ECT-ALGORITHMS which take into account characteristics of the physical topology with respect to equal cost.

30. The method of claim 25, wherein the convergence sensitive traffic is real-time traffic and the non-sensitive traffic is best effort traffic.

31. A method of performing multiple rounds of forwarding tree computations to distribute traffic load on network links between nodes in a network, the method implemented by each node comprising the steps of:
- performing, by each node, a first round of forwarding tree computations to determine forwarding trees for convergence sensitive traffic using standard Equal Cost Tree (ECT)-ALGORITHMS;
- performing, by each node, a second round of forwarding tree computations to determine forwarding trees for non-sensitive traffic using opaque ECT-ALGORITHMS which take into account characteristics of a physical topology of the network with respect to equal cost, wherein the opaque ECT-ALGORITHMS have an Organizationally Unique Identifier (OUI) which is different than an OUI of the standard ECT-ALGORITHMS;
- using, by each node, the forwarding trees computed in the first round to route the convergence sensitive traffic in the network, and further using the forwarding trees computed in the second round to route the non-sensitive traffic in the network;
- wherein the second performing step further includes the steps of:
  - computing a single opaque ECT-ALGORITHM to represent the physical topology of the network;
  - determining equal costliness of the physical topology of the network;
  - assigning the non-sensitive traffic to the opaque ECT-ALGORITHMS based on equal costliness; and
  - computing the forwarding trees for the non-sensitive traffic using opaque ECT-ALGORITHMS which take into account characteristics of the physical topology with respect to equal cost; and
- wherein the single opaque ECT-ALGORITHM has a smallest first four bit index and a smallest second four bits when compared to the opaque ECT-ALGORITHMS which means the single opaque ECT-ALGORITHM is computed before the other opaque ECT-ALGORITHMS.

32. A method of performing multiple rounds of forwarding tree computations to distribute traffic load on network links between nodes in a network, the method implemented by each node comprising the steps of:
- performing, by each node, a first round of forwarding tree computations to determine forwarding trees for convergence sensitive traffic using standard Equal Cost Tree (ECT)-ALGORITHMS;
- performing, by each node, a second round of forwarding tree computations to determine forwarding trees for non-sensitive traffic using opaque ECT-ALGORITHMS which take into account characteristics of a physical topology of the network with respect to equal cost, wherein the opaque ECT-ALGORITHMS have an Organizationally Unique Identifier (OUI) which is different than an OUI of the standard ECT-ALGORITHMS;
- using, by each node, the forwarding trees computed in the first round to route the convergence sensitive traffic in the network, and further using the forwarding trees computed in the second round to route the non-sensitive traffic in the network;
- wherein the second performing step further includes the steps of:
  - computing a single opaque ECT-ALGORITHM to represent the physical topology of the network;
  - determining equal costliness of the physical topology of the network;
  - assigning the non-sensitive traffic to the opaque ECT-ALGORITHMS based on equal costliness; and computing the forwarding trees for the non-sensitive traffic using opaque ECT-ALGORITHMS which take into account characteristics of the physical topology with respect to equal cost; and wherein the step of computing the forwarding trees for the non-sensitive traffic using the opaque ECT-ALGORITHMS further includes the steps of:

determining a link load for each network link;

if the physical topology is not equal costly, then generating a modified link cost based on an originally configured link cost and the link load for each network link; or if the physical topology is equal costly, then concatenating a prefix in front of a Path ID used for tie-breaking and updating the tie-breaking prefix such that a result of a link load function is used, wherein the Path ID is a sorted list of IDs of the network links that a path traverses;

using the link loads and either the modified link costs and the updated tie-breaking prefix when computing the forwarding trees.

33. The method of claim 32, wherein the link load for each network link is the number of forwarding trees into which the given network link is already included in during the first performing step.

34. The method of claim 33, wherein the link load for each network link is further based on a number of Base VIDs or I-SIDs carried or the traffic transmitted of congestion information.

35. The method of claim 32, wherein the link load is based on a modified link load to smooth an effect of the link load on the computed forwarding tress for the non-sensitive traffic.

* * * * *

UNITED STATES PATENT AND TRADEMARK OFFICE
CERTIFICATE OF CORRECTION

PATENT NO. : 8,923,164 B2
APPLICATION NO. : 13/143593
DATED : December 30, 2014
INVENTOR(S) : Farkas et al.

Page 1 of 1

It is certified that error appears in the above-identified patent and that said Letters Patent is hereby corrected as shown below:

In the Specification

In Column 2, Line 5, delete "there are" and insert -- there are multiple paths between the source node and the transmit node. --, therefor.

In Column 4, Line 20, delete "standard." and insert -- standard --, therefor.

In Column 7, Line 31, delete "Index," and insert -- $Index_1$ --, therefor.

In Column 7, Line 32, delete "Index," and insert -- $Index_1$ --, therefor.

In Column 7, Line 35, delete "Index," and insert -- $Index_1$ --, therefor.

In Column 10, Line 35, delete "Index," and insert -- $Index_1$ --, therefor.

Signed and Sealed this
Twenty-third Day of February, 2016

Michelle K. Lee
*Director of the United States Patent and Trademark Office*